United States Patent [19]

Brown, Jr.

[11] Patent Number: 5,066,177
[45] Date of Patent: Nov. 19, 1991

[54] ATTACHMENT TO A PORTABLE POWER PLANAR

[76] Inventor: John H. Brown, Jr., P.O. Box 473, Spanish Fort, Ala. 36527

[21] Appl. No.: 624,589

[22] Filed: Dec. 10, 1990

[51] Int. Cl.$^5$ .............................................. B27C 5/10
[52] U.S. Cl. ..................................... 409/178; 30/475; 144/117 A
[58] Field of Search ............... 409/175, 178, 181, 182; 144/117 A, 117 C; 30/475

[56] References Cited

U.S. PATENT DOCUMENTS

| | | | |
|---|---|---|---|
| 1,413,712 | 4/1922 | Eisunga | 409/175 |
| 2,491,106 | 12/1949 | Grasser | 30/475 X |
| 2,805,696 | 9/1957 | Thompson | 30/475 |
| 4,584,772 | 4/1986 | Bergler | 30/475 |

Primary Examiner—Z. R. Bilinsky
Attorney, Agent, or Firm—Jennings, Carter, Thompson & Veal

[57] ABSTRACT

An attachment for use with a portable power planer for consistently producing a scarf cut of a particular angle in sections of plywood or like material which are to be joined to form a continuous piece of material. The attachment produces the scarf cut by positioning blades of the power planar at an angle in relation to the horizontal top surface of the plywood or like material. The blades of the planar, when moved longitudinally across said plywood or like material, removes a section of plywood or like material corresponding to the angle. Consistent angles are maintained and scarf cuts are produced quickly and consistently in materials to be joined.

12 Claims, 3 Drawing Sheets

ATTACHMENT TO A PORTABLE POWER PLANAR

FIELD OF THE INVENTION

The present invention is a detachable accessory to a portable power planer capable of producing scarf cuts in plywood or like material. In particular, the attachment is capable of consistently producing a cut of a particular angle in sections of plywood or like material. The invention positions the cutting blades of the power planer at a particular angle to the top surface of the material being cut and as the planer with attachment is moved across the material, a section of material corresponding to the angle is removed by the blades.

BACKGROUND OF THE INVENTION

A scarf joint is used to form a continuous piece from sections of plywood or like material. Traditionally, the joint is formed by cutting or notching or a combination of cutting and notching two ends of sheet material then gluing, strapping or bolting the two ends together. The joint thus matches two tapered cuts on two sections of material.

The matching of scarf cuts was, traditionally, performed by repeated use of a hand or power planer across the material until the two pieces of material had compatible scarf cuts. The scarf cut, if not produced by hand, was produced by the power planer being attached to a work bench or a frame. Trial and error was the only way to produce compatible scarf cuts which, when joined, formed a perfectly matched interface. The process of forming matching cuts was difficult and lengthy and usually had to be performed by a skilled craftsman.

My invention overcomes the herein cited problems by consistently and quickly producing matching scarf cuts on materials being joined. My invention, when attached to a standard power planer, enables an inexperienced craftsman to rapidly produce consistently matching scarf cuts needed to form a continuous piece of material.

SUMMARY OF THE INVENTION

It is the object of this invention to facilitate the joining of sections of material into an elongated length of material by enabling a worker to rapidly produce exact scarf cuts on each section.

It is yet another object of my invention to provide an attachment to a power planer which can be adapted to produce a scarf cut in various thicknesses of plywood or like material.

These and other objects and advantages of the invention will be more fully set forth in the following specification and claims considered in connection with the attached drawings to which they relate.

BRIEF DESCRIPTION OF THE DRAWINGS

Apparatus embodying features of my invention are depicted in the accompanying drawings which form a portion of this disclosure and wherein.

DESCRIPTION OF THE PREFERRED EMBODIMENTS

Figure 1:
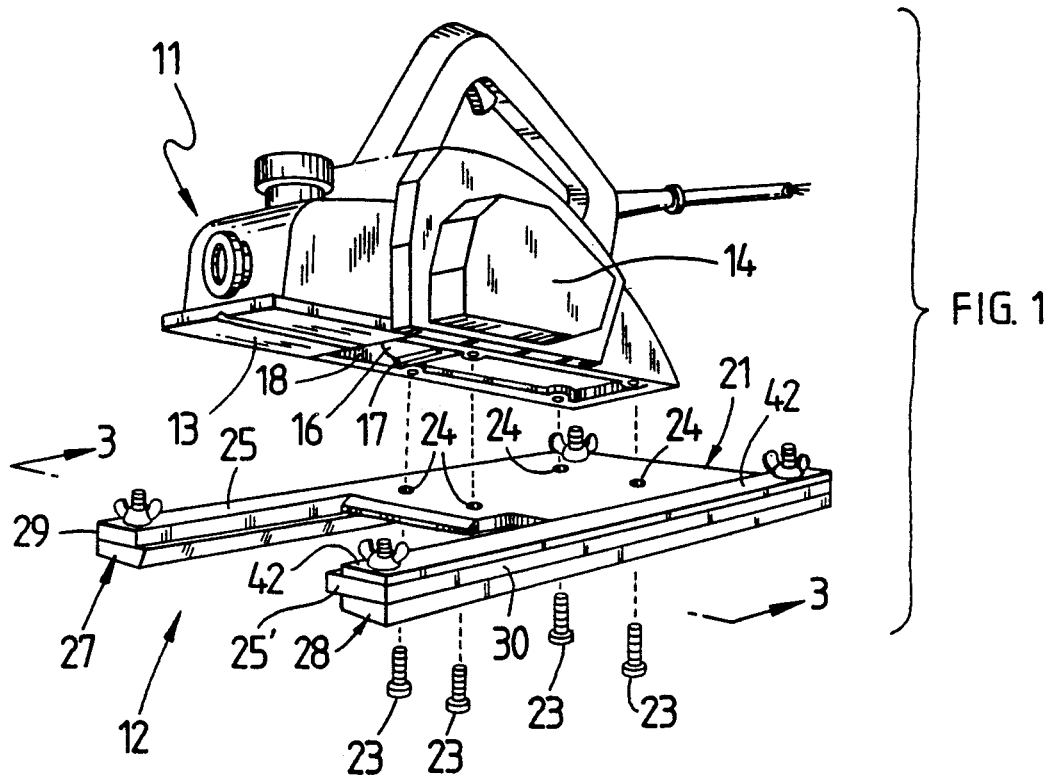
FIG. 1 shows a perspective view of the attachment spaced from the power planer.
Figure 2:
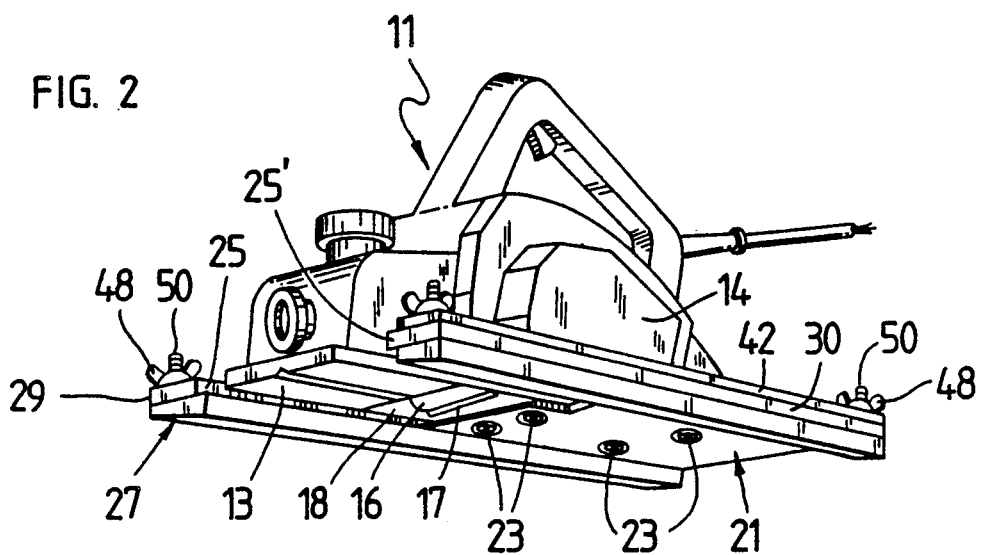
FIG. 2 is a perspective view from beneath the power planer with the attachment connected thereto.

Referring to FIGS. 1 and 2 for a better understanding of my invention, FIG. 1 illustrates a portable power planer 11 with my attachment 12 positioned beneath the bottom surface 13 of the planer 11 to enable the planer to form scarf cuts. The planer 11 has a motor, encased within a body 14, not shown, for driving a cutter 16 comprising of cutting blades 17 rotably mounted on an axis transverse to the body 14. The blades 17 extend through an opening 18 in the bottom surface 13 of the planer 11 to engage the material to be planed. As is clearly shown in FIG. 1, the attachment 12 is comprised of a mounting plate 21 with elongated members 27 and 28.

The mounting plate 21 has a plurality of holes 24 extending through the mounting plate adapted to receive a plurality of screws 23 which secure the attachment to the bottom surface 13 of the planer 11. Further, the mounting plate 21 has a pair of forwardly extending members 25 and 25' defining an opening which extends from the front of the planer 11 to a point rearwardly of the cutter 16.

As shown in FIG. 2, the elongated members 27 and 28 are detachably affixed subjacent the mounting plate on either side of the opening. A first elongated member 27 is detachably connected beneath a first longitudinal edge portion 29 of the plate 21 and extending forwardly beneath an extending member 25. The second elongated member 28 is detachably connected parallel to the first elongated member 27 and beneath the other extended member 25' along a second longitudinal edge portion 30.

The elongated members 27 and 28 are each identical in shape and size having a flat bottom 32 and an inclined top 31 such that when the elongated members 27 and 28 are attached subjacent the mounting plate, the tops 31 are aligned in the same plane and the bottoms 32 are held in vertically spaced horizontal planes. As will be understood, the elongated members taper laterally such that the plane of the tops 31 intersects the plane of the bottoms 32. The intersection of the plane of the tops 31 with the plane of the bottoms 32 forms an angle 40 which corresponds to the taper of the scarf cut.

The mounting plate 21 and the elongated members 27 and 28 could be formed by a molding process; therefore, the elongated members 27 and 28 would be affixed to the mounting plate 21.

Figure 3:
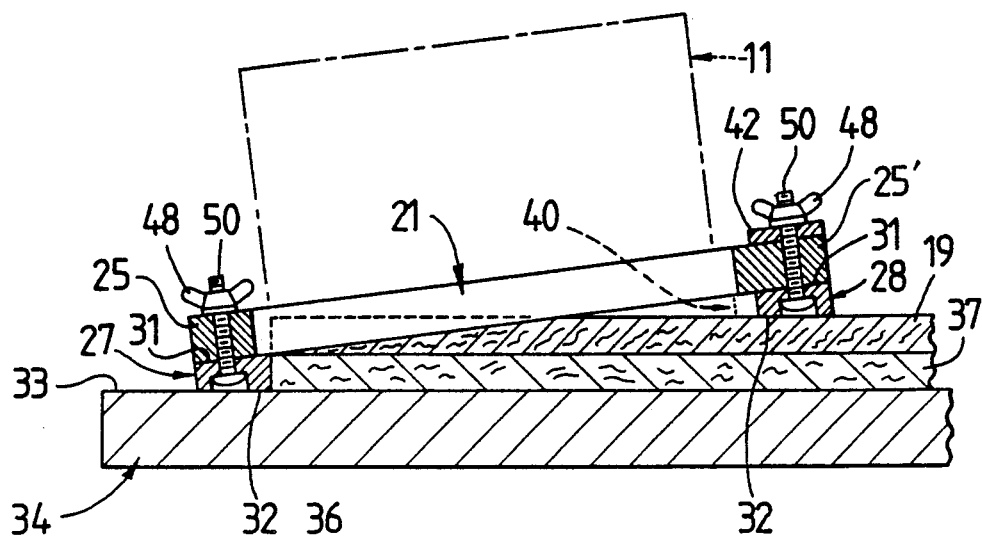
FIG. 3 is a sectional view taken across the attachment and a subjacent work piece.

With reference to FIG. 3, the bottom 32 of first elongated member 27 rests on a top surface 33 of a support piece 34, such as a table. First elongated member 27 has a vertical surface 36 formed between the bottom 32 and top 31. The elongated member 27 is wider than the extending member 25 overlying it such that vertical surface 36 is positioned inwardly of the extending member 25 to engage a side of a support piece 37 which underlies material 19 to be cut by the planer 11. The bottom 32 of the second elongated member 28 rests on an upper surface of the material 19 to be cut.

As previously noted, the plane of the tops 31 of the elongated members 27 and 28 intersects the planes of the bottoms 32 at a particular angle 40. The blades 17 of the plane 11 are positioned at the same angle 40. The blades 17, as they remove the material 19, form a scarf cut having a taper corresponding to the angle 40. In short, the taper of the scarf cut corresponds to the angle 40 of the intersection of the plane of the tops 31 and the planes of the bottoms 32.

Figure 4:
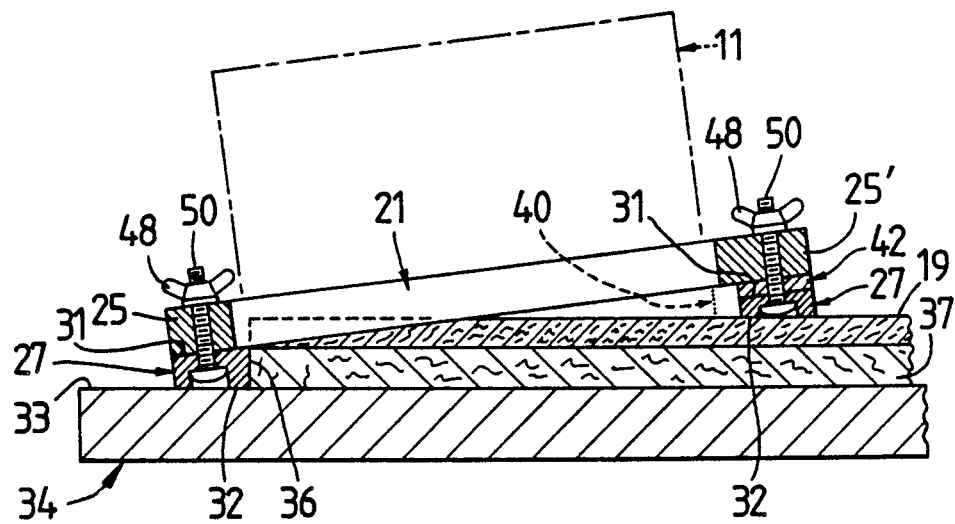
FIG. 4 is a sectional view as in FIG. 3 with a shim used to vary the height of one side of the attachment.
Figure 5:
FIG. 5 depicts a scarf joint.
Figure 6:
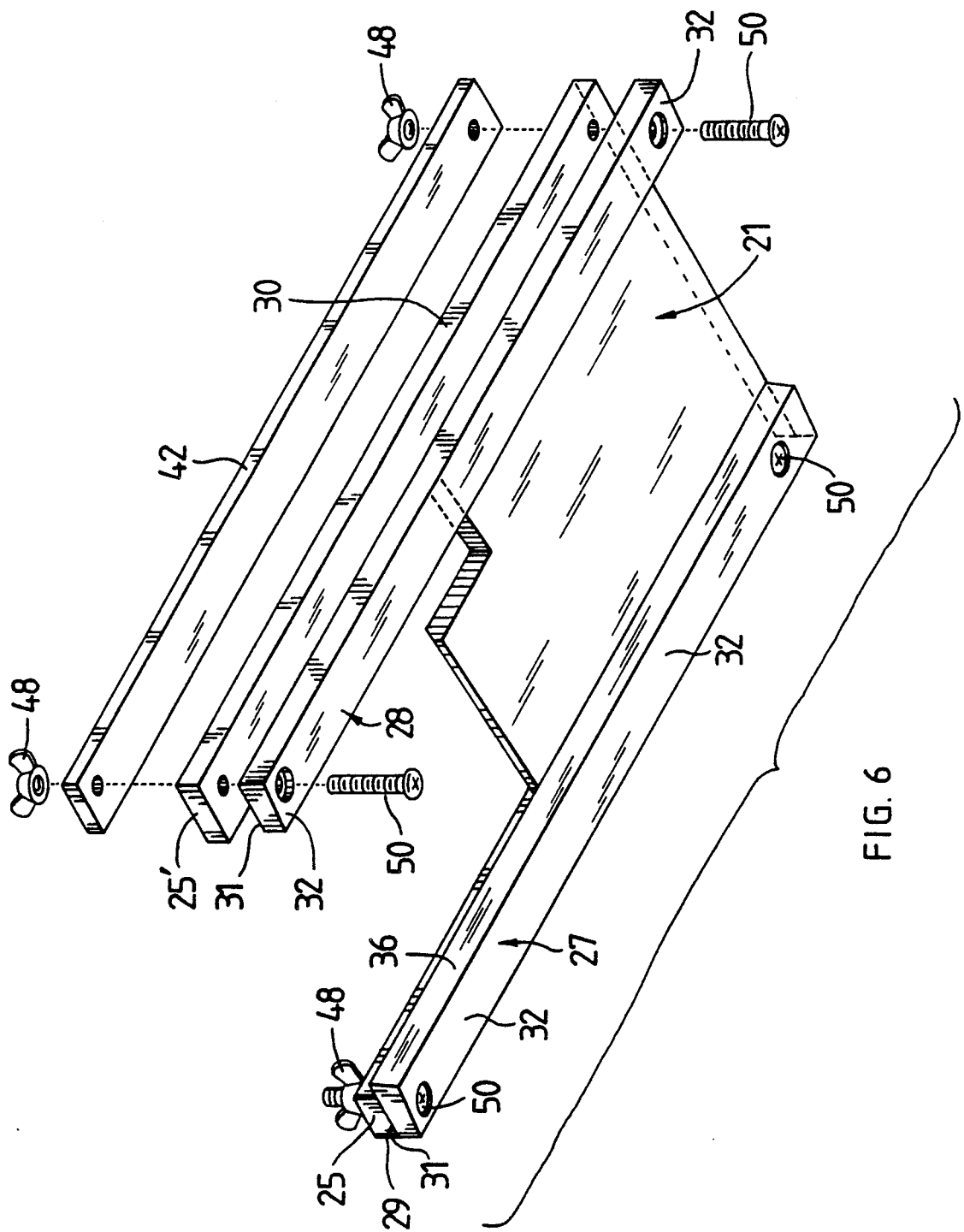
FIG. 6 is an exploded perspective view of the attachment.

The attachment guide can be adapted for cutting various thicknesses of plywood or like material 19. Referring to FIG. 4, a shim 42 is positioned between the mounting plate 21 and the second elongated member 28 or if the second elongated member 28 is affixed to the mounting plate, the shim 42 is positioned beneath the second member 28. The shim 42 is necessary to adjust the height of the upper side of the device when a thinner piece of material 19 is being cut. As FIG. 4 illustrates, when a thinner piece of plywood 19 is used, the second elongated member drops; therefore, the height of the second elongated member 28 must be raised by the shim to accommodate for this difference in thickness. The shim 42 is stored atop the mounting plate 21 until needed and held in place by wing nuts 48 and round head machine screws 50 as is clearly shown in FIG. 6.

While I have described my invention in two forms, it will be obvious to one skilled in the pertinent art that it is not so limited, but is susceptible to various changes and modifications without departing from the spirit thereof.

What I claim:

1. An attachment for producing a scarf cut of a particular angle in plywood or like material, when used with a portable power planer of the type having a body encased within said body a motor for driving a cutter having cutting blades rotably mounted about an axis transverse to said body, comprising:
    (a) a mounting plate detachably secured subjacent a bottom surface of said body, said mounting plate defining an elongated opening which extends from the front of said planer to a point rearwardly of the cutter;
    (b) first elongated member connected to said mounting plate subjacent a first longitudinal edge portion of said mounting plate and having a wedge shape tapering downwardly from said elongated opening; and
    (c) second elongated member connected to said mounting plate subjacent a second longitudinal edge portion of said mounting plate parallel to said first elongated member and having a wedge shape tapering downwardly toward said elongated opening, each of said elongated members being of equal height such that said mounting plate is supported therein at an angle corresponding to the taper of said elongated members.

2. An attachment as defined in claim 1 further comprising means for maintaining said angle of said cut for a selected thickness of said material.

3. An attachment as defined in claim 2 wherein said means for maintaining comprises a shim detachably positioned vertically adjacent said second elongated member wherein said shim adjusts the height of said second member for a selected thickness of material.

4. An attachment as defined in claim 1 wherein said mounting plate has a plurality of holes extending through the mounting plate adapted to receive a plurality of screws which secure said attachment to said planer.

5. An attachment as defined in claim 1 wherein said elongated opening is further defined by a pair of spaced apart extending members integral and coplanar with said mounting plate and extending on either side of said cutter.

6. An attachment as defined in claim 1 further comprising a vertical surface formed on said first elongated member to serve as a guide surface abutting a work piece placed beneath said material, such that said first elongated member is supported at an elevation lower than said material to be cut and said second elongated member rests atop said material.

7. An attachment to a planer capable of producing scarf cuts of consistent angles in sections of material used to form a continuous piece of said material, said power planer of the type having a body encasing a motor for driving a cutter with linear blades rotably mounted about a transverse axis to said body, comprising a mounting plate defining an elongated opening which extends from the front of the planer to a point rearwardly of the cutter having affixed subjacent a first longitudinal edge portion of said mounting plate a first elongated member and having affixed subjacent a second longitudinal edge portion of said mounting plate parallel to said first elongated member a second elongated member, said elongated members have a common taper such that said mounting plate is supported in an inclined plane by said members, to allow said planer to be moved longitudinally across said material to form a scarf cut at an angle corresponding to the taper of said elongated members.

8. An attachment as defined in claim 5 further comprising a means for maintaining the angle of said scarf cut for a selected thickness of said material.

9. An attachment as defined in claim 5 wherein said means for maintaining comprises a shim detachably positioned beneath said second elongated member wherein said shim adjusts the height of the said second member for a selected thickness of material.

10. An attachment as defined in claim 5 wherein said mounting plate has a plurality of holes extending therethrough to receive a plurality of screws which secure said attachment to said planer.

11. An attachment as defined in claim 7 wherein said elongated opening is further defined by a pair of spaced apart extending members integral and coplanar with said mounting plate and extending on either side of said cutter.

12. An attachment as defined in claim 7 further comprising a vertical surface formed on said first elongated member to serve as a guide surface abutting a work piece placed beneath said material, such that said first elongated member is supported at an elevation lower than said material to be cut and said second elongated member rests atop said material.

* * * * *